J. H. CARR.
WAVE POWER MECHANISM.
APPLICATION FILED FEB. 14, 1912. RENEWED FEB. 3, 1913.
1,073,214.
Patented Sept. 16, 1913.
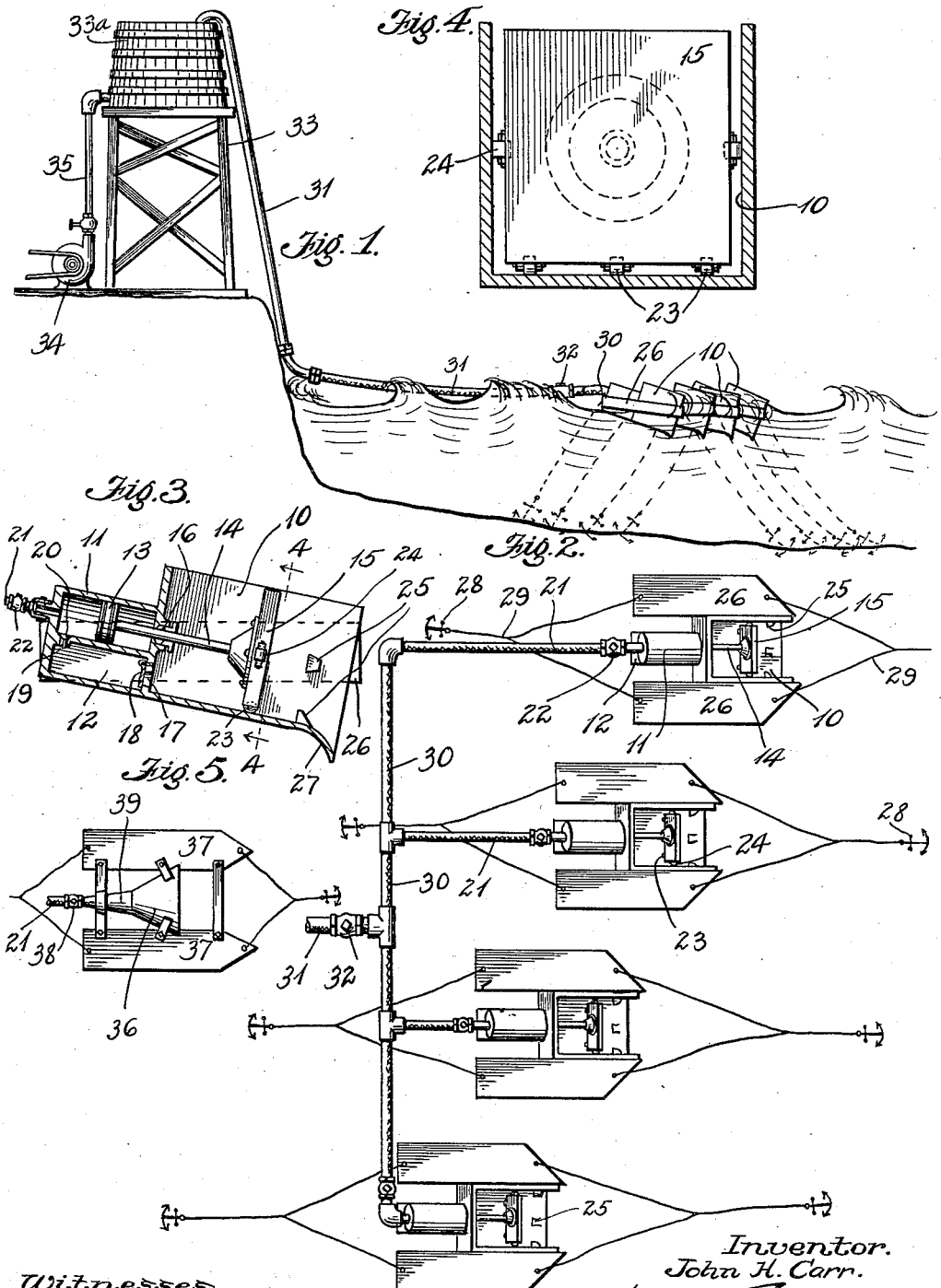
Inventor.
John H. Carr.

UNITED STATES PATENT OFFICE.

JOHN H. CARR, OF ALHAMBRA, CALIFORNIA, ASSIGNOR TO WILLIAM K. CARR, OF ALHAMBRA, CALIFORNIA.

WAVE-POWER MECHANISM.

1,073,214.   Specification of Letters Patent.   Patented Sept. 16, 1913.

Application filed February 14, 1912, Serial No. 677,621. Renewed February 3, 1913. Serial No. 746,035.

*To all whom it may concern:*

Be it known that I, JOHN H. CARR, a citizen of the United States, residing at Alhambra, in the county of Los Angeles and State of California, have invented new and useful Improvements in Wave-Power Mechanisms, of which the following is a specification.

This invention relates to improvements in wave power mechanisms and it is an object of the invention to provide means whereby the action of the waves may be caused to accumulate and lift water to a suitable height for the performing of work. It is also an object of the invention to provide mechanism for receiving water from the waves of the ocean, the waves being made to pump and elevate portions of the water received, to a suitable elevation for the performance of work.

In the accompanying drawing forming a part of this specification, Figure 1 is a side elevation of the mechanism forming the subject matter of this invention, the bank of the sea being indicated. Fig. 2 is a top plan view of the mechanism, the piping leading to the storage reservoir being broken away. Fig. 3 is a vertically longitudinal sectional view taken through one of the actuating mechanisms of the device. Fig. 4 is a transverse sectional view through the same upon an enlarged scale and taken upon the line 4—4 of Fig. 3. Fig. 5 is a top plan view of a modified form of wave engaging mechanism.

The mechanism of the present invention is designed to facilitate the receiving of water from the waves of the ocean, in such a manner that successive waves will tend to force the water received by the mechanism, to a suitable height for accomplishing work.

In the drawing a practical embodiment of the invention has been disclosed, in which one or more water receiving receptacles 10 are employed and preferably made in the form of open troughs having bottom and side walls and an end wall. Each of said devices is also provided with an extension formed with a cylinder 11 therein and a water chamber 12. The mechanism is provided with any desired number of troughs 10 but since they are all preferably made alike a description of one will be sufficient for all. In each cylinder 11 a piston 13 is mounted which is connected by means of a piston rod 14, with an actuating platen or piston 15 mounted in the troughs 10. The piston rod 14 passes through any suitable packing gland 16 so as to prevent the passage of water past the same.

The end wall of the trough 10 is provided with an opening 17, communicating with the interior of the chamber 12 and a valve 18 is mounted within said chamber so as to normally close said opening 17 and prevent water from flowing from the same back into the trough 10. An opening 19 also connects the said chamber 12 with the outer end of the cylinder 11 and a valve 20 controls the same preventing water from returning to said chamber from the cylinder. Leading from the outer end of the cylinder 11, is a pipe 21 adapted to conduct the water pumped in said cylinder to any desired point for use, and a check valve 22 is interposed in said pipe for preventing a back flow of water.

The platen 15 is preferably formed with anti-friction rollers 23 upon its bottom edge and similar rollers 24 at its side edges, so that the said platen may freely and easily move under the action of the water within the trough. The platen does not usually fit snugly against the walls of the trough, there being a sufficient play between the parts to prevent any possibility of the platen becoming jammed within the same. Each trough is provided with a series of stops 25 which limit the downwardly and outer movement of the platen 15.

The structure involving the trough 10 with the cylinder 11 and water chamber 12, is preferably supported upon the water by means of one or more floats 26, there being usually two of said floats, one arranged upon each side of the trough. The trough is also generally arranged in incline position between said floats, so that its open end dips into the water to a small extent. The lower edges of said troughs are also generally curved downwardly as at 27 to facilitate the guiding of the water into the same. The floats 26 are anchored in position by any suitable anchors 28 and cables 29 which connect them with the floats, as clearly shown in the drawing.

As above intimated there are preferably a number of water engaging mechanisms provided for each wave power apparatus and the pipes 21 connect with transverse piping 30, which leads the water to a common discharge pipe 21. A check valve 32 is also usually interposed in the said discharge pipe 31. The discharge pipe 31 is arranged to deliver the water at any desired point and preferably directs the same to a tank or reservoir 32 which is supported in any suitable manner as by a standard or framing 33. The water accumulated in said tank may be used by one or more pumps 34 supplied with water from the tank 32 by piping 35. In this way the water may be caused to perform work upon any desired mechanism.

The mechanism is so placed that the troughs supported on the floats will have their open ends turned to receive the incoming water in the successive waves of the sea. The water from the waves will thus dash into the open ends of the troughs and strike the platens 15 forcing them inwardly and thus operating the pistons 13 for pumping water into the pipes 21. Each platen 15 will descend in its trough 10 when the water recedes and any water behind the platen will assist in carrying it downwardly together with the suction of the receding water. As the water dashes into the trough again it will force the platen inwardly and cause the piston 13 to travel upwardly in the cylinder with great force. The downward movement of the piston 13 will draw water in the cylinder 11 from the water chamber 12, water entering the same passing the valve 18 when the platen is being driven inwardly. At the time when the said platen is driven inwardly the piston will be forcing the water which has been sucked into the cylinder 11, into the pipe 21 past the check valve 22. The valve 19 prevents the water from returning to the chamber 12. In employing a number of troughs, it is preferable to set them successively at different distances from the shore so that the waves will strike them in succession and at different periods. The water continuously forced in the pipes 21 will pass the check valve 32 and be driven through the pipe 31 into the tank 32.

The troughs may be modified as shown in Fig. 5 in which a funnel shaped water collector or trough 36 is adapted to be mounted upon floats 37. In this structure no pistons or moving parts are employed, the water merely going into the tapered funnel shaped trough and being forced past the check valve 38 and into the pipe leading to the reservoir. In using the funnels 36 they are preferably provided with smaller tapered portions 39 which further facilitate the crowding of the water into the piping under the action of successive waves.

What I claim is:

1. A wave motor mechanism, comprising a trough member and a pumping member therein adapted to be engaged and operated by the waves.

2. A wave power mechanism, comprising water receiving troughs, movable members mounted therein adapted to be reciprocated by the water, and pistons operated by the movement of said members for forcing water to a suitable height for use.

3. A wave power mechanism, comprising a plurality of troughs, pistons mounted thereon, water chambers connected with the troughs and with the pistons, valves controlling apertures in the walls thereof, platens moving in the troughs and operating the said pistons, and anti-friction means facilitating the operation of said platens.

4. A wave power mechanism, comprising a series of troughs, platens operable therein, pumps operated by said platens, buoyant members for supporting the troughs at approximately the surface of the water, piping for conducting the water from the troughs, checking means preventing the return of the water to the piping and a distributing reservoir for receiving the water and dispensing it, in a driving mechanism for performing work.

In witness that I claim the foregoing I have hereunto subscribed my name this 7th day of February, 1912.

JOHN H. CARR.

Witnesses:
  E. STADTMAN,
  EARLE R. POLLARD.

---

Copies of this patent may be obtained for five cents each, by addressing the "Commissioner of Patents, Washington, D. C."